J. COHEN & A. J. CONNELL.
METALLIC PARTITION.
APPLICATION FILED NOV. 12, 1915.

1,292,263.

Patented Jan. 21, 1919.
7 SHEETS—SHEET 3.

WITNESSES:

INVENTOR

BY

ATTORNEY

J. COHEN & A. J. CONNELL.
METALLIC PARTITION.
APPLICATION FILED NOV. 12, 1915.

1,292,263.

Patented Jan. 21, 1919.
7 SHEETS—SHEET 6.

WITNESSES:

INVENTOR

ATTORNEY

J. COHEN & A. J. CONNELL.
METALLIC PARTITION.
APPLICATION FILED NOV. 12, 1915.

1,292,263.

Patented Jan. 21, 1919.
7 SHEETS—SHEET 7.

UNITED STATES PATENT OFFICE.

JACOB COHEN AND ANDREW J. CONNELL, OF COLLEGE POINT, NEW YORK, ASSIGNORS TO EMPIRE ART METAL CO., INC., A CORPORATION OF NEW YORK.

METALLIC PARTITION.

1,292,263.      Specification of Letters Patent.      Patented Jan. 21, 1919.

Application filed November 12, 1915. Serial No. 61,009.

*To all whom it may concern:*

Be it known that we, JACOB COHEN and ANDREW J. CONNELL, citizens of the United States, and residents of College Point, Long Island, in the State of New York, have invented certain new and useful Improvements in Metallic Partitions, of which the following is a specification.

This invention relates to metallic partitions.

By the use of our invention we are enabled to produce a metallic partition having a minimum number of parts which may be standardized to meet a variety of conditions such as the varying heights of ceilings or of the partitions required or varying lengths of rooms required to be divided, and other structural modifications, and furthermore may be erected, removed and reërected under such varying conditions with extraordinary rapidity, a minimum of labor and without the destruction or marring of material.

Furthermore, we are enabled to produce a metallic partition which will embody a series of spaced panel-bracket units of considerable size which may be set up and connected to the floor and which when so set up will not only form the bulk or main body of the partition proper but will constitute a rigid base to which the trim parts, such as ornamental cornices, pilasters, or like separable moldings may be attached on opposite sides. Each of such units in our preferred construction comprises a stationary lower section having stile and rail members and movable upper section also having stile and rail members movable vertically in relation to the lower section, the said upper and lower sections preferably joining each other beneath a suitable intermediate cornice molding, and each of such units is also preferably provided with means coöperating with means carried by the trim parts for securing the latter to opposite sides of the units without the use of screws, nails or other independent fastening devices.

Another feature of our invention is the securing in one operation and by a single element of cornice moldings at opposite sides of the partition as well as the frictional locking against movement of the movable unit section in relation to the stationary unit section, and to this end, we provide each of the cornice moldings for the opposite faces of the partition with anchoring flanges along the upper and lower marginal edges. These lower marginal flanges abut at their edges and outer sides for the space between the stile members of a unit against L-shaped flanges formed on opposite sides of the center line of the marginal edges of the top rail of the stationary panel-bracket units, and said flanges abut at their opposite sides against upward extensions of the said stile members comprising reinforcing channels, a seat for such flanges having interrupted back and front walls being thus formed.

The top longitudinal flanges of the opposite cornice moldings are preferably coupled together and retained against said reinforcing channels by means of a loose or removable coupling rail having opposite marginal flanges which upon being pressed into place will abut against and engage the outer surfaces of the opposing top flanges of said cornice moldings and retain the same securely in place without the employment of screws, nails or like devices. Said loose or removable rail also preferably abuts at its ends against the extensible or vertical movable stile members of a unit and frictionally locks the vertically-movable members against movement relatively to the stationary section, thus again avoiding the use of separate fastening devices.

Another feature of our invention is the provision in adjacent stile members of the panel-bracket units of vertically disposed pilaster guide grooves on each face of the partition which are adapted to receive and seat the marginal flanges of one section of a divided pilaster molding in combination with slots suitably spaced vertically and adapted to coöperate with clips secured on the inner surface of such pilaster molding sections, whereby one section of the pilaster molding may not only be guided so as to be readily and quickly secured by the clips but a neat joint with the face of the partition will be formed.

The invention also consists of certain other novel features of construction and combinations and arrangements of parts which will be fully described in the specification and particularly pointed out in the claims.

In the accompanying drawings in which similar reference characters designate corresponding parts throughout the several views.

Figure 2:
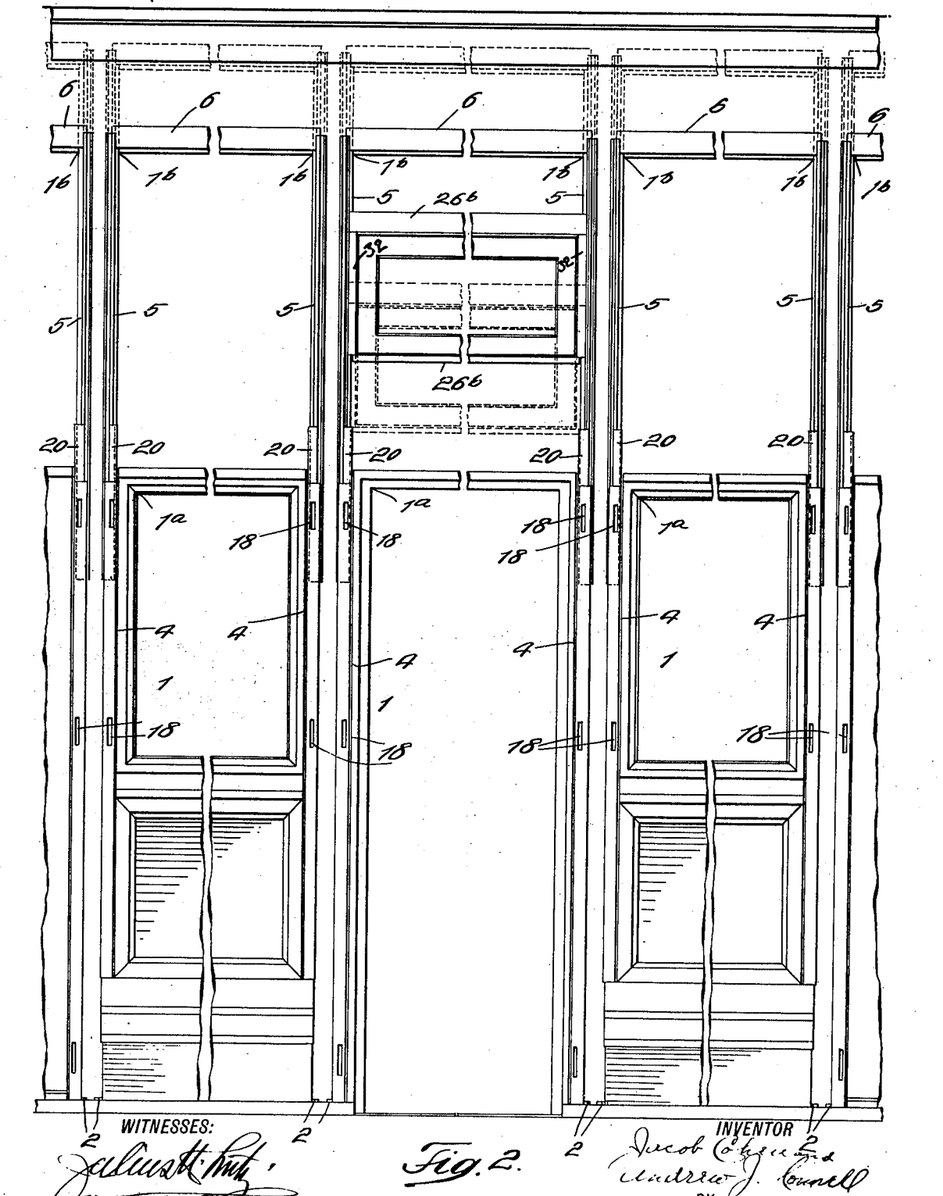
Fig. 2 is an elevation similar to Fig. 1 of the panel-bracket units as set up before the application of the removable molding parts such as the pilaster and cornice moldings at opposite sides of the partition.

Referring now to these drawings 1 indicates a panel bracket unit, a series of which will comprise a partition and which, as more particularly shown in Fig. 2, are, in assembling, spaced apart and secured at the lower opposing corners to the floor, each unit preferably being provided with foot brackets 2 which may be screwed or otherwise secured to the floor.

Each panel bracket unit preferably comprises a stationary panel bracket section 1$^a$ and a vertically-movable bracket section 1$^b$. These panel bracket sections may have one or more panels either metal, glass or both as desired, and are preferably joined together beneath a suitable intermediate cornice molding 3.

According to our invention, the stile members 4—4 of the stationary section 1$^a$ of panel bracket unit are rolled up into hollow conformation so as to provide channels to permit the sliding within the same of movable stile members 5—5 which are preferably connected at their upper ends by a rail 6. These stationary and movable stile members respectively, may, of course, be of any suitable conformation and the upper movable stile members may be disposed in any suitable position within the lower stile members, that is to say, the movable member may occupy the entire space within the stationary member or any desired portion thereof.

Figure 13:
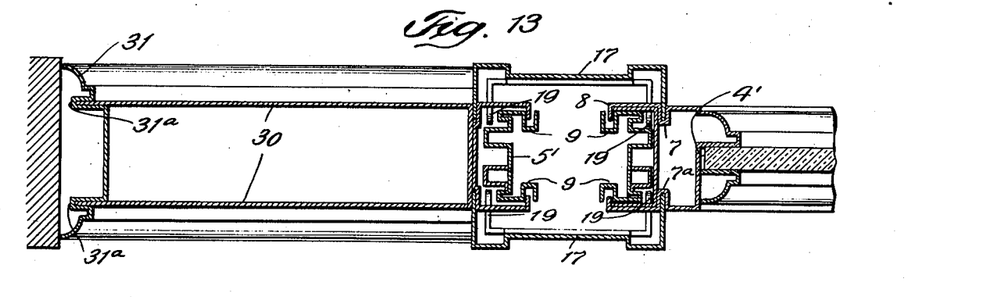
Fig. 13 is a similar section on the line 13—13 of Fig. 1.
Figure 14:
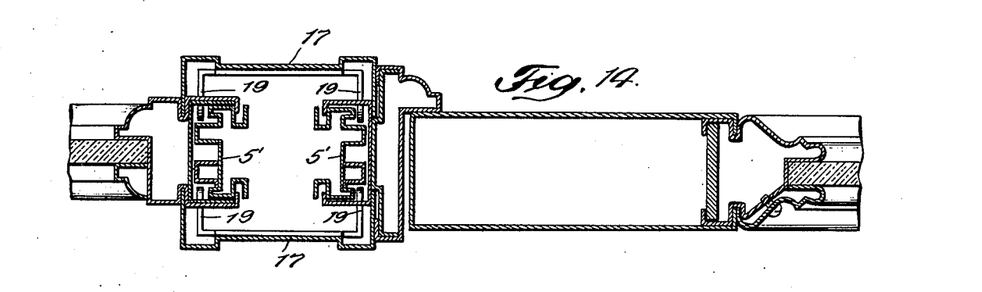
Fig. 14 is a similar section on the line 14—14 of Fig. 1.
Figure 15:
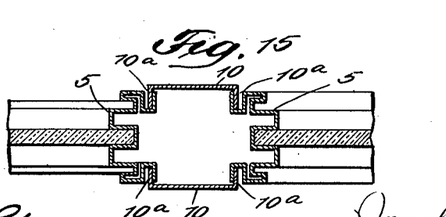
Fig. 15 is a similar section on the line 15—15 of Fig. 1.
Figure 16:
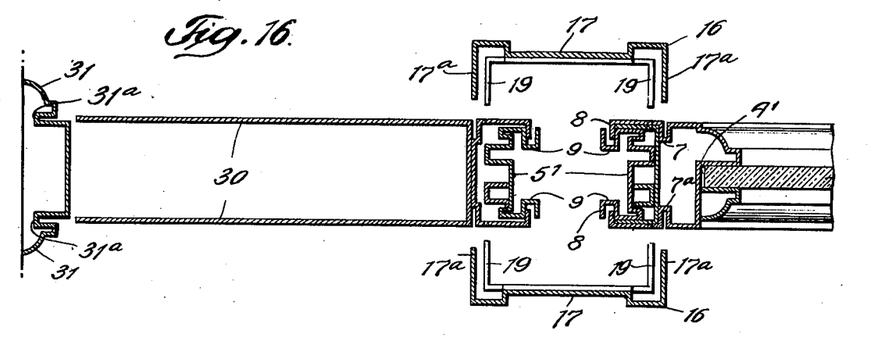
Fig. 16 is a sectional view similar to Fig. 13 with the parts spaced relatively from each other.
Figure 17:
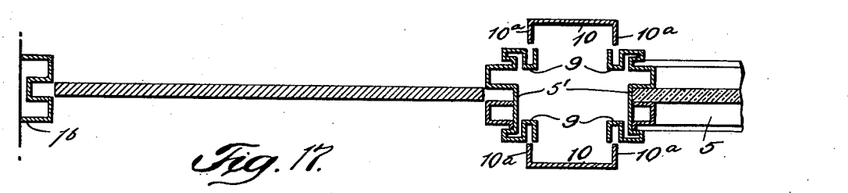
Fig. 17 is a view similar to Fig. 16 on the line 11—11 of Fig. 1.

In the preferred form of partition shown, however, the stile member of the lower of stationary section is rolled or bent intermediate its edges to form the usual panel seat 4' intermediate its edges as shown at the right of Figs. 13 and 16, and also at opposite sides of such panel seats, the metal is bent to form inwardly extending grooves 7—7$^a$ disposed vertically in the stiles, (which grooves provide seats for flanges of pilaster molding sections as will be hereinafter explained,) and the opposite longitudinal edges of the stiles are bent inwardly at right angles to the face of the stile so as to form marginal flanges 8—8. Between these marginal flanges and one side of the wall of the grooves 7—7 a channel is thus formed for the upper or movable stile member 5. This movable member is also preferably formed with the usual panel-seat intermediate its longitudinal edges and with vertically-disposed and inwardly extending grooves 9—9 at opposite sides of the panel seats. Said vertically-disposed inwardly-extending grooves of the movable stile members are adapted to provide a guiding seat when in telescoped position for the oppositely disposed marginal flanges 8—8 of the lower stationary section and when in extended position will provide seats for the flanges 10$^a$—10$^a$ of a section of pilaster moldings 10—10 for the movable unit section as will be more fully hereinafter explained. It will thus be seen that the movable stile member may move or slide freely within its seat in the stationary stile member and will be guided in its vertical movement in relation thereto. It will also be seen that when the upper end of both stile members are connected by a rail such as 6, also provided with a panel seat 6', a vertically-movable panel-bracket section, having panel bracket moldings with seats at its top and two sides will be provided so that upon the insertion of a loose bottom rail a complete upper panel bracket will be formed, thus permitting a large structural unit embodying ornamental panel brackets or integral panel moldings, and also carrying the metallic panels to be made and assembled at the factory and sent to the building all ready for quick erection and furthermore these units will not only form the main exposed part of the partition proper, but will provide a rigid base for the attachment of other moldings and will have means to permit the attachment of such moldings without the use of screws, nails or like fastening devices.

Figures 3, 4, 5:
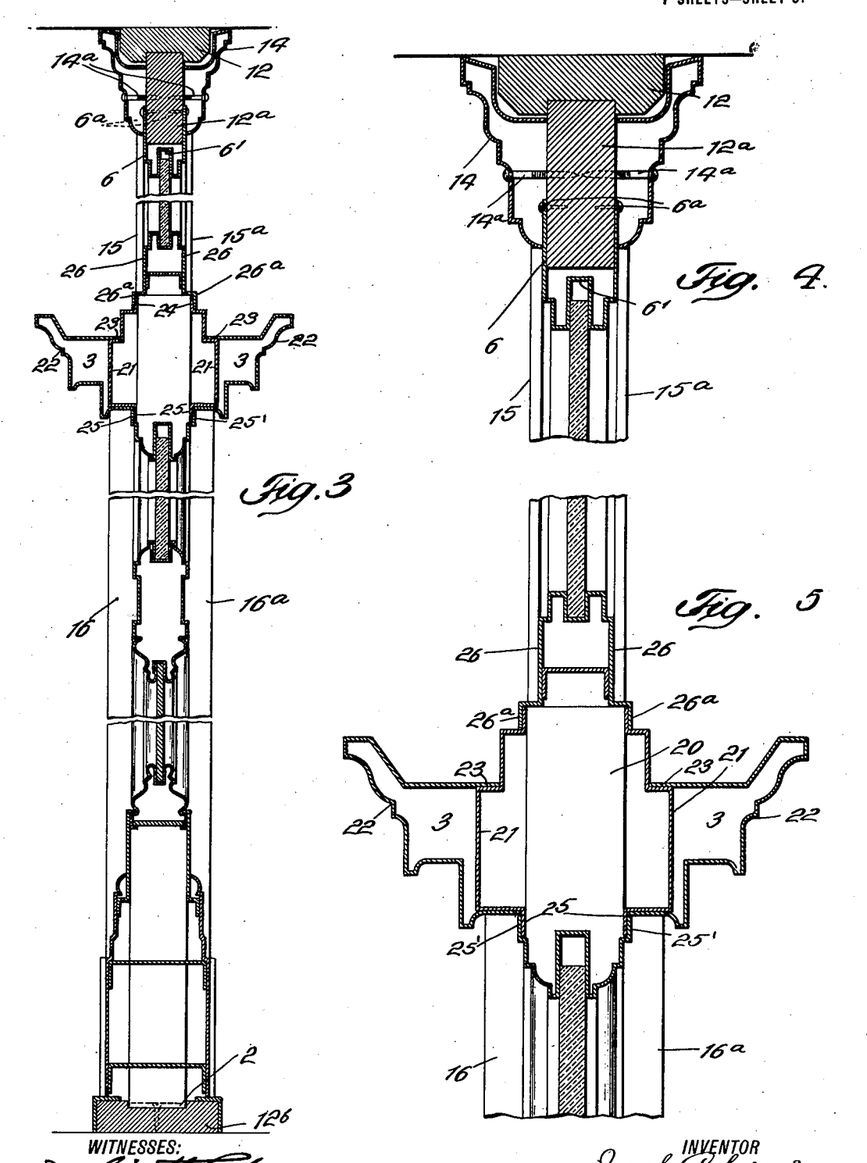
Fig. 3 is a vertical section on the line 3—3 of Fig. 1.
Figs. 4, 5 and 6 respectively are enlarged sections on the lines 4—4, 5—5 and 6—6 respectively of Fig. 1.
Figure 6:
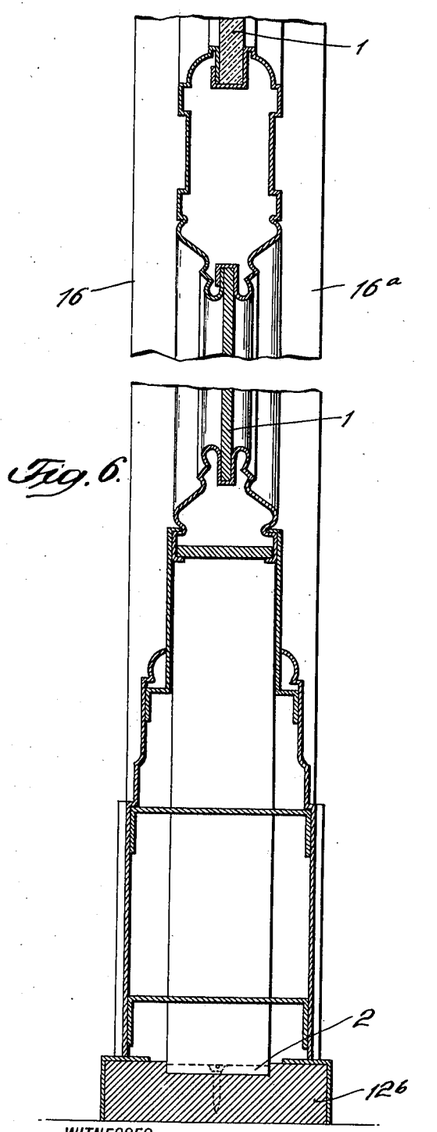
Figure 7:
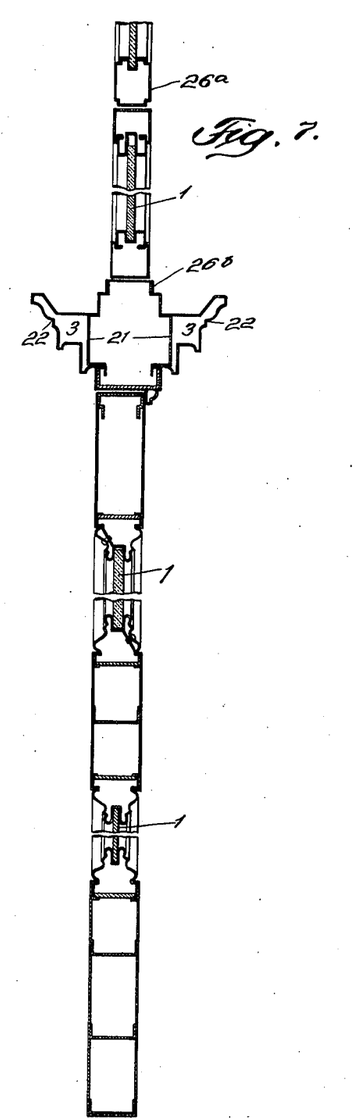
Fig. 7 is a section on the line 7—7 of Fig. 1.

In the preferred form of our invention illustrated, we secure in any suitable manner to the ceiling, ceiling strips 12—12ª (Figs. 3 and 4) preferably composed of strips of wood suitably secured together, and the floor may also be provided with floor strips 12ᵇ in alinement therewith. The said large structural unit is set up and secured as aforesaid to the floor or floor strips, the upper or top unit section is moved upwardly to the ceiling, though our said partition may be set at any suitable distance, the upper edges of the rail 6 and the movable stile members 5, which are hollow and open at the top, will fit snugly over and inclose a portion of said ceiling strips 12—12ª as will more particularly appear from Figs. 3 and 4. We then preferably initially set the unit sections by tacking the said upper portions to the said strip 12ª with tacks 6ª.

If now desired, the top cornice molding 14 may be applied and secured to the core strips by screws 14′ or in any other suitable manner and pilaster moldings 15—15 for the opposite sides of the top section being first applied and connected preferably at its upper end by nailing to the said ceiling strip 12 or in any other suitable manner, such as by clipping the same within suitable slots in the grooves of the movable stile members of adjacent panel sections. These top pilaster moldings are preferably in lengths cut to the size of the panel, but if desired may extend downwardly for a considerable distance and standard lengths may thus be employed.

Figures 18, 19:
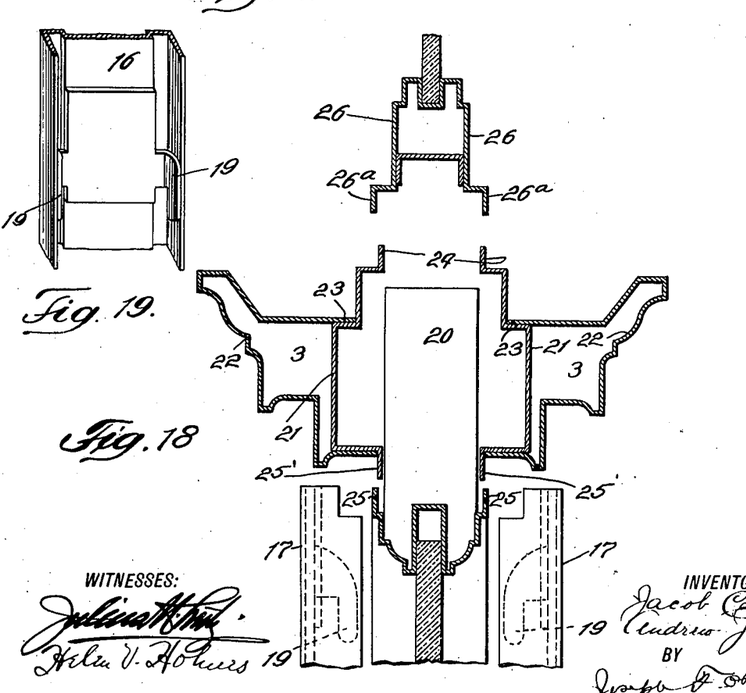
Fig. 18 is a view in vertical section similar to Fig. 5 of the cornice molding and contiguous parts with the parts spaced from each other.
Fig. 19 is a view of the inner surface of a section of pilaster molding of the lower panel-unit.

Lower pilaster moldings 16—16 on opposite faces of the partition are employed to cover the spaces between adjacent stationary sections of the units, and each of these pilaster moldings (see Figs. 13, 16 and 19) preferably comprise a central ornamental web or bridging portion and straight marginal flanges 17ª—17ª which extend inwardly from said bridging portion and are adapted to be inserted in the grooves 7 and 7 of the adjacent stile members of abutting panel bracket sections. In this way, a guiding arrangement for attachment of the pilaster molding is provided and a concealed joint is formed between the pilaster moldings and unit sections.

To secure said pilasters in place we preferably provide each stile member with a plurality of vertically spaced slots 18 and also provide the inner surface of the pilaster molding with clips 19 spaced to correspond with said slot so that the pilaster moldings may be secured by an inward and downward movement thereof into the grooves, which grooves will act as guides for guiding the clips into their corresponding slots.

In order to secure rigidity at the joining line between the stationary and movable sections and for the further purpose of providing a base for the intermediate cornice moldings, as hereinafter described, we preferably provide contiguous to said joining line channel-iron extensions 20 which are suitably secured by welding or otherwise within the stationary stile members and which extend above the stationary sections a distance substantially equal to the width of the intermediate cornice moldings 3 to be employed as will be seen in Figs. 2, 3, 5, 8 and 18. These cornice moldings 3 preferably extend laterally clear across the partition to be erected, and are each preferably formed of what we shall term an inner metal core or securing part 21 and an outer ornamental or molding part 22 which is securely welded at 23 to the inner core part. As shown, in said figures, the inner core part of each intermediate cornice molding is provided along its opposite longitudinal or marginal edges with vertically extending upper and lower flanges 24 and 25. The lower flange of opposite moldings is adapted to fit in a seat having interrupted rear and front walls formed at the upper edge of the stationary panel bracket section, the front wall and floor of said seat being formed by an L-shaped flange 25′ on the marginal edge of the top rail of the stationary section, and the rear wall being formed by the channel-iron extension 20 which are set in a distance equal to the thickness of the metal used. When the lower flange of a cornice molding is inserted within said seat at the rail portion of a unit, it is backed up by the channel iron at the stile portions thereof, and this lower flange will thus be effectively retained against all movement except a tilting movement. Obviously, if the top flanges are now secured the cornice molding will be securely retained in place. We preferably lock the top flanges of the cornice molding on opposite sides of the partition simultaneously by means of a removable or loose rail 26, which is hollow in conformation and not only forms the bottom rail of a vertically-movable unit section, for which purpose it is usually provided substantially along its longitudinal center line with a suitable panel seat but has its opposing longitudinal or marginal edges provided with locking flanges 26ª adapted to fit over the top flanges 24 of opposite intermediate cornice moldings 3. Said rail of course bridges the space between said opposite flanges. Furthermore, said rail is preferably of such a length relatively to the width of the panel that its opposite ends will, when it is pressed to its seat, engage and frictionally without the use of screws or other loose fastening devices, secure the movable stile members and movable unit section against movement relatively to the stationary unit section.

Figure 1:
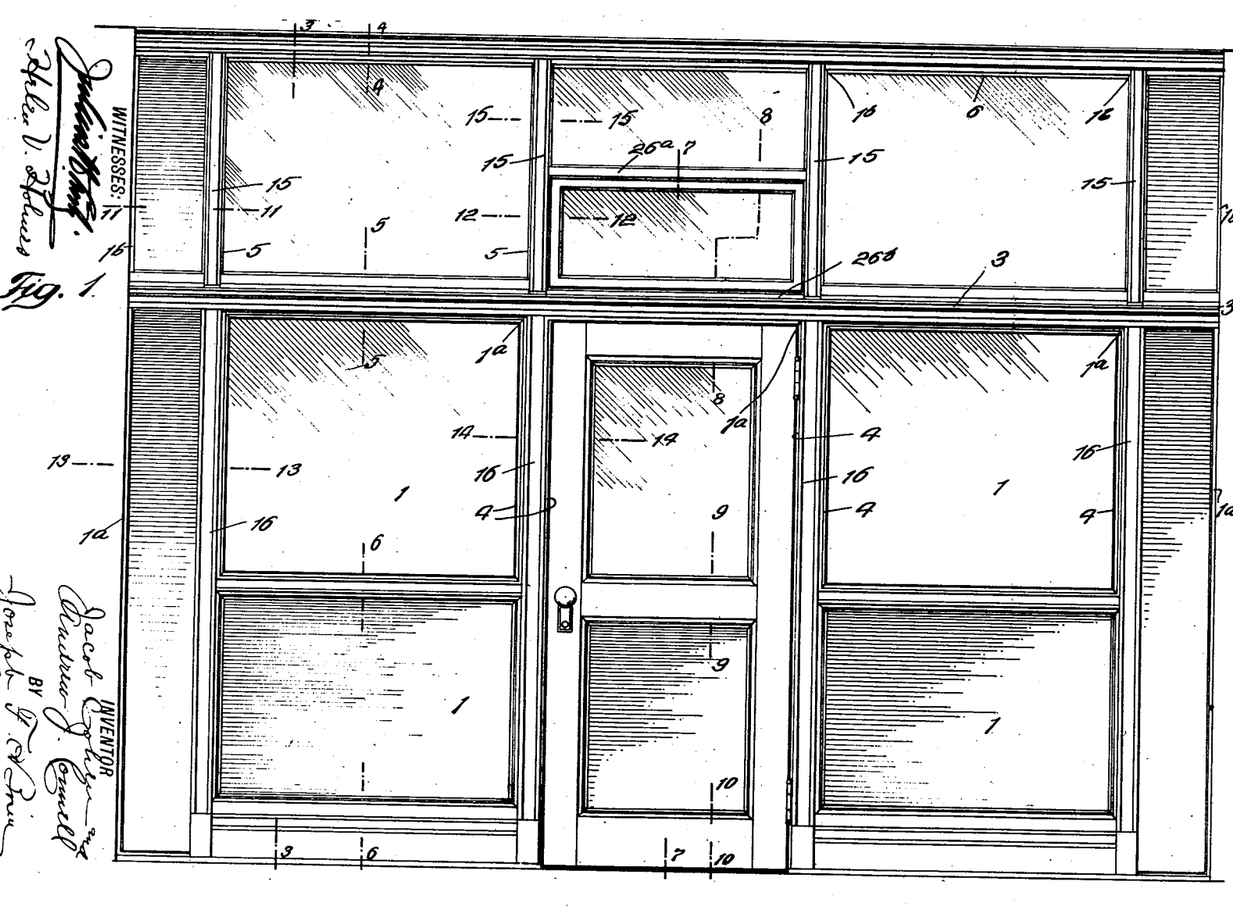
Figure 1 is an elevation of a portion of partition embodying my invention.
Figures 8, 9:
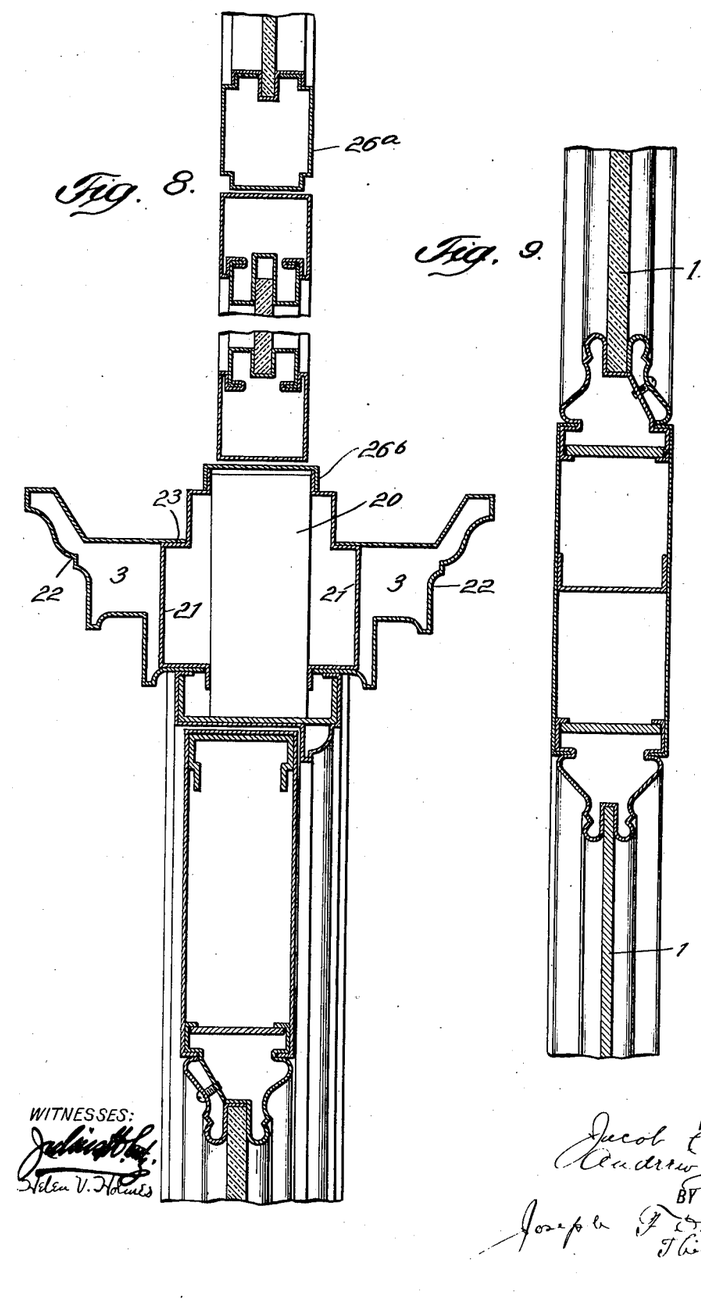
Figs. 8, 9 and 10 respectively are enlarged sections on the lines 8—8, 9—9 and 10—10 respectively of Fig. 1.
Figure 10:
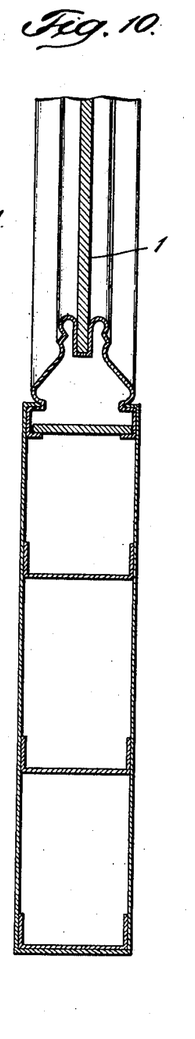
Figure 11:
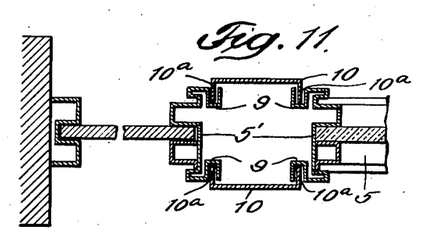
Fig. 11 is a horizontal section on the line 11—11 of Fig. 1.
Figure 12:
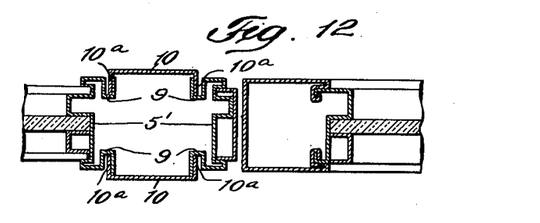
Fig. 12 is a similar section on the line 12—12 of Fig. 1.

In our improved partition we provide, as shown in Figs. 1 and 2, a doorway and transom in a single unit, and wherever we use the words "panel bracket unit" the same may be equally applied to a door frame unit, the only difference being that the stiles of the door frame instead of panel brackets are made hollow and have vertically-movable members seated within the same. Where a partition unit is provided with a transom, as illustrated in Figs. 1, 2 and 8, we preferably have the transom sash mounted independently in slides 32 as shown in Fig. 2, though such transom may be a part of the stationary section of the unit. In any event, it will be inserted at the factory, and the removable or loose rail 26$^a$ may be inserted above the top rail of the transom sash during the erection of the partition as well as a loose rail 26$^b$ beneath the same. In other respects, the construction is substantially similar to that of a panel bracket unit.

At times it is desired to provide filler panels and for this purpose we have illustrated a filler panel bracket which comprises stiles 30 having molding portions 31 with grooves 31$^a$—31$^a$. These moldings are secured to the walls in the usual well known manner and the filler panels may be formed in one piece and substituted for an ornamental panel-seat of a panel bracket unit, as shown at the left hand side of Fig. 13 in which case, it will, at one vertical edge be provided with pilaster grooves and a channel for a movable upper member, and the opposite vertical edge will be open so that the marginal edges may be seated within the grooves in the said stiles 30.

Obviously many modifications of said partition will suggest themselves to those skilled in the art.

Having described our invention, we claim:

1. In metallic partitions, a series of independent units formed of sheet metal and comprising the base and body of the completed partition, each unit embodying a complete stationary panel bracket having integral hollow stiles at the opposite vertical edges thereof, each of which stiles is bent intermediate its edges to provide a vertically-disposed channel; rail members connecting said stiles; panels carried by said panel brackets; pilaster moldings bridging the adjacent stiles of said stationary panel brackets and secured thereto; a vertically-movable, extensible stile member mounted within each channel of the stationary panel bracket; panels between the movable stiles of a unit; and pilaster moldings bridging the adjacent movable stile members and suitably retained thereon.

2. A partition embodying a series of independent units, each comprising a stationary and a vertically movable section, the stationary section having at its opposite vertical edges, hollow stile members each provided with a channel, and the vertically-movable section having stile members mounted to slide within said opposite channels; and a loose rail in the movable section adapted at its opposite ends to frictionally engage the opposite movable stile members and to force the same into frictional locking engagement with the walls of said opposite channels.

3. A partition embodying a series of units having stile and rail members, trim parts including a cornice molding adapted to be secured thereto, said molding having a vertically-disposed flange at its lower longitudinal edge, a supporting seat for said flange comprising a rail section having an L-shaped flange abutting against one side and bottom of said cornice flange for a portion of its length and a stile section abutting against the opposite side of said cornice flange at a different portion of its length, and means for securing the opposite longitudinal edge of said cornice molding.

4. A partition embodying a series of units having stile and rail members, trim parts including intermediate cornice moldings on opposite faces of the partition, each molding having vertically disposed marginal flanges at the opposite longitudinal edges thereof, a supporting seat on opposite faces of the partition for one of the marginal flanges of each molding, and a loose rail movable vertically in relation to the stile members for bridging and connecting together marginal flanges at the opposite longitudinal edges of said cornice molding.

5. A partition embodying a series of units having stile and rail members, trim parts including intermediate cornice moldings on opposite faces of the partition, each molding having vertically disposed marginal flanges at the opposite longitudinal edges thereof, a supporting seat on opposite faces of the partition for one of the marginal flanges of each molding, said seat having interrupted back and front walls, one of such walls comprising a rail section and the other a stile section and a loose rail movable vertically in relation to the stile members for bridging and connecting together marginal flanges at the opposite longitudinal edges of said cornice molding.

6. A partition embodying a stationary and a vertically movable panel bracket; trim parts including intermediate cornice moldings on opposite faces of the partition, each molding having vertically-disposed marginal flanges at the opposite longitudinal edges thereof, a supporting seat on opposite faces of the stationary section of said units for supporting the lower marginal edges of said cornice molding; and a loose rail carried by and movable vertically in relation to the movable panel bracket for bridging and connecting together the marginal flanges at the opposite longitudinal edges of said cornice molding and simultaneously locking the movable section in relation to the stationary section.

7. A metallic partition embodying a series of spaced units, each unit having integral stationary metallic stile and rail members, each stile member being rolled up to form an inwardly extending vertically-disposed groove, and having spaced vertically-disposed slots contiguous to said groove in combination with pilaster moldings having a web portion bridging the space between the stile members of adjacent units and marginal flanges adapted to seat in the said vertically-disposed grooves, and clips carried on the inner surface of said pilaster moldings coöperating with said slots to detachably connect said molding to the adjacent units and form a concealed joint therewith.

8. A partition embodying a series of independent units, each comprising a lower stationary section, and an upper vertically movable section; the stationary section having integral hollow stile members at the opposite vertical edges of said units; each stile being rolled to provide a panel seat, a molding portion, and inwardly-extending vertically disposed grooves intermediate the vertical edges thereof and also having inwardly-extending, vertically-disposed marginal flanges whereby a channel is formed between the walls of said grooves and said flanges; and the movable section having stile members seated within the channels so formed.

9. A partition embodying a series of spaced units, each comprising a lower stationary section and an upper vertically-movable section, the stationary section having hollow stile members, each stile being rolled to provide a panel seat and inwardly extending vertically-disposed grooves intermediate the vertical edges thereof and having inwardly extending marginal flanges, whereby a channel is formed between the walls of said grooves and said flanges, the movable section having stile members each seated within said channel, and having a vertically-disposed slot adapted to fit over and be guided by the inwardly-disposed marginal flanges of the stationary member.

10. A partition embodying a series of spaced units, each comprising a lower stationary section and an upper vertically-movable section, the stationary section having hollow stile members, each stile being rolled to provide a panel seat and inwardly extending vertically-disposed grooves intermediate the vertical edges thereof and having inwardly extending marginal flanges, whereby a channel is formed between the walls of said grooves and said flanges, the movable member having stile members each seated within said channel, and having a vertically-disposed slot adapted to fit over and be guided by the inwardly-disposed marginal flanges of the stationary member, and pilaster moldings for the upper and lower sections, each having a web portion and inwardly-disposed flanges, the inwardly disposed flanges of the lower molding seating within the grooves in the stiles of adjacent units and the pilaster moldings for the upper movable stile members fitting within said vertically-disposed slots in such stile members.

In witness whereof, we have signed our names to the foregoing specification in the presence of two subscribing witnesses.

JACOB COHEN.
ANDREW J. CONNELL.

Witnesses:
HELEN V. HOLMES,
STALLO VINTON.